US012158132B2

(12) United States Patent
Suckewer et al.

(10) Patent No.: US 12,158,132 B2
(45) Date of Patent: *Dec. 3, 2024

(54) METHOD AND APPARATUS FOR OPERATING TRAVELING SPARK IGNITER AT HIGH PRESSURE

(71) Applicant: Knite, Inc., Ewing, NJ (US)

(72) Inventors: Artur P. Suckewer, Franklin Park, NJ (US); Szymon Suckewer, Princeton, NJ (US); Frederick H. Selmon, III, Lawrenceville, NJ (US)

(73) Assignee: Knite, Inc., Ewing, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,225

(22) Filed: Aug. 6, 2021

(65) Prior Publication Data

US 2022/0030694 A1 Jan. 27, 2022

Related U.S. Application Data

(63) Continuation of application No. 16/711,083, filed on Dec. 11, 2019, now abandoned, which is a (Continued)

(51) Int. Cl.
*F02P 9/00* (2006.01)
*F02P 3/08* (2006.01)
(Continued)

(52) U.S. Cl.
CPC ................. *F02P 9/007* (2013.01); *F02P 3/08* (2013.01); *F02P 3/0807* (2013.01); (Continued)

(58) Field of Classification Search
CPC ................... F02B 1/12; F02D 13/0265; F02D 2041/2051; F02D 2041/288; (Continued)

(56) References Cited

U.S. PATENT DOCUMENTS 3,394,285 A 7/1968 Lindsay
3,413,518 A 11/1968 Chafer et al.
(Continued)

FOREIGN PATENT DOCUMENTS

DE 10 2006 037 039 A1 2/2008
GB 2 073 313 A 10/1981
(Continued)

OTHER PUBLICATIONS

U.S. Appl. No. 17/866,427, filed Jul. 15, 2022, Suckewer et al.
(Continued)

*Primary Examiner* — Renan Luque

(74) *Attorney, Agent, or Firm* — Wolf, Greenfield & Sacks, P.C.

(57) ABSTRACT

An ignition circuit and a method of operating an igniter (preferably a traveling spark igniter) in an internal combustion engine, including a high pressure engine. A high voltage is applied to electrodes of the igniter, sufficient to cause breakdown to occur between the electrodes, resulting in a high current electrical discharge in the igniter, over a surface of an isolator between the electrodes, and formation of a plasma kernel in a fuel-air mixture adjacent said surface. Following breakdown, a sequence of one or more lower voltage and lower current pulses is applied to said electrodes, with a low "simmer" current being sustained through the plasma between pulses, preventing total plasma recombination and allowing the plasma kernel to move toward a free end of the electrodes with each pulse.

22 Claims, 7 Drawing Sheets

Related U.S. Application Data continuation of application No. 15/932,360, filed on Feb. 16, 2018, now abandoned, which is a continuation of application No. 15/186,319, filed on Jun. 17, 2016, now abandoned, which is a continuation of application No. 14/933,938, filed on Nov. 5, 2015, now abandoned, which is a continuation of application No. 14/094,922, filed on Dec. 3, 2013, now abandoned, which is a continuation of application No. 13/222,298, filed on Aug. 31, 2011, now Pat. No. 8,622,041, which is a continuation of application No. 12/313,927, filed on Nov. 26, 2008, now Pat. No. 8,186,321, which is a continuation of application No. 11/407,850, filed on Apr. 19, 2006, now Pat. No. 7,467,612.

(60) Provisional application No. 60/672,892, filed on Apr. 19, 2005.

(51) Int. Cl.
*F02P 23/04* (2006.01)
*H01T 13/50* (2006.01)
*H05H 1/48* (2006.01)

(52) U.S. Cl.
CPC ............. *F02P 3/0815* (2013.01); *F02P 23/04* (2013.01); *H01T 13/50* (2013.01); *H05H 1/48* (2013.01)

(58) Field of Classification Search
CPC .... F02D 41/3041; F02D 41/402; F02N 19/00; F02P 15/10; F02P 17/12; F02P 2017/121; F02P 2017/125; F02P 23/04; F02P 23/045; F02P 3/01; F02P 3/02; F02P 3/04; F02P 9/002; F02P 9/007; H01T 13/04; H01T 13/06; H01T 13/20; H01T 19/00; H01T 19/02; H01T 19/04; Y02T 10/128; Y02T 10/18; Y02T 10/44
See application file for complete search history.

(56) References Cited

U.S. PATENT DOCUMENTS

| | | | | | |
|---|---|---|---|---|---|
| 3,567,987 | A | | 3/1971 | Schnurmacher | |
| 3,788,293 | A | | 1/1974 | Anderson | |
| 3,842,819 | A | | 10/1974 | Atkins et al. | |
| 3,908,146 | A | | 9/1975 | Pasbrig | |
| 4,041,922 | A | | 8/1977 | Abe et al. | |
| 4,122,816 | A | | 10/1978 | Fitzgerald et al. | |
| 4,130,101 | A | | 12/1978 | Jundt et al. | |
| 4,366,801 | A | | 1/1983 | Endo et al. | |
| 4,369,756 | A | | 1/1983 | Ezoe | |
| 4,369,758 | A | | 1/1983 | Endo | |
| 4,398,526 | A | | 8/1983 | Hamai et al. | |
| 4,418,660 | A | | 12/1983 | Endo et al. | |
| 4,433,669 | A | | 2/1984 | Ishikawa et al. | |
| 4,448,181 | A | | 5/1984 | Ishikawa et al. | |
| 4,455,989 | A | | 6/1984 | Endo et al. | |
| 4,471,732 | A | | 9/1984 | Tozzi | |
| 4,487,177 | A | | 12/1984 | Ishikawa | |
| 4,487,192 | A | | 12/1984 | Anderson et al. | |
| 4,493,297 | A | | 1/1985 | McIlwain et al. | |
| 4,677,960 | A | | 7/1987 | Ward | |
| 4,760,341 | A | * | 7/1988 | Skerritt ................. | F02P 15/003 73/112.01 |
| 4,760,820 | A | | 8/1988 | Tozzi | |
| 4,766,855 | A | | 8/1988 | Tozzi | |
| 4,774,914 | A | | 10/1988 | Ward | |
| 4,795,937 | A | | 1/1989 | Wagner et al. | |
| 4,805,570 | A | | 2/1989 | Davis | |
| 4,841,925 | A | | 6/1989 | Ward | |
| 4,846,129 | A | * | 7/1989 | Noble ..................... | F02P 17/12 123/634 |
| 4,893,605 | A | | 1/1990 | Ozawa | |
| 4,930,473 | A | | 6/1990 | Dietrich | |
| 4,996,967 | A | | 3/1991 | Rosswurm et al. | |
| 5,007,389 | A | | 4/1991 | Kashiwara et al. | |
| 5,076,223 | A | | 12/1991 | Harden et al. | |
| 5,131,376 | A | | 7/1992 | Ward et al. | |
| 5,187,404 | A | | 2/1993 | Straub | |
| 5,197,448 | A | | 3/1993 | Porreca et al. | |
| 5,207,208 | A | | 5/1993 | Ward | |
| 5,211,142 | A | | 5/1993 | Matthews et al. | |
| 5,215,066 | A | | 6/1993 | Narishige et al. | |
| 5,228,425 | A | | 7/1993 | Simons | |
| 5,377,633 | A | | 1/1995 | Wakeman | |
| 5,423,306 | A | | 6/1995 | Trigger et al. | |
| 5,429,103 | A | | 7/1995 | Rich | |
| 5,456,241 | A | | 10/1995 | Ward | |
| 5,513,605 | A | | 5/1996 | Weldon | |
| 5,517,961 | A | | 5/1996 | Ward | |
| 5,555,862 | A | | 9/1996 | Tozzi | |
| 5,564,403 | A | | 10/1996 | Codina et al. | |
| 5,619,959 | A | | 4/1997 | Tozzi | |
| 5,731,654 | A | | 3/1998 | Benedikt et al. | |
| 5,754,011 | A | | 5/1998 | Frus et al. | |
| 5,704,321 | A | | 6/1998 | Suckewer et al. | |
| 6,131,542 | A | | 10/2000 | Suckewer et al. | |
| 6,131,555 | A | * | 10/2000 | Tozzi ...................... | F02P 3/053 123/623 |
| 6,321,733 | B1 | | 11/2001 | Suckewer et al. | |
| 6,474,321 | B1 | | 11/2002 | Suckewer et al. | |
| 6,553,981 | B1 | | 4/2003 | Suckewer et al. | |
| 6,568,362 | B2 | | 5/2003 | Whealton et al. | |
| 6,603,245 | B1 | | 8/2003 | Fletcher | |
| 6,662,793 | B1 | | 12/2003 | Allen et al. | |
| 6,670,777 | B1 | | 12/2003 | Petruska et al. | |
| 6,729,317 | B2 | | 5/2004 | Kraus | |
| 6,814,047 | B2 | | 11/2004 | Vogel et al. | |
| 6,924,608 | B2 | | 8/2005 | Czernichowski et al. | |
| 7,095,181 | B2 | | 8/2006 | Frus et al. | |
| 7,121,270 | B1 | | 10/2006 | Plotnikov | |
| 7,309,951 | B2 | | 12/2007 | Cleeves | |
| 7,467,612 | B2 | | 12/2008 | Suckewer et al. | |
| 7,518,085 | B1 | | 4/2009 | Krishnan | |
| 7,714,488 | B2 | | 5/2010 | Nagasawa et al. | |
| 8,186,321 | B2 | * | 5/2012 | Suckewer ................. | F02P 3/08 123/620 |
| 8,622,041 | B2 | | 1/2014 | Suckewer et al. | |
| 10,859,058 | B1 | | 12/2020 | Rothenbuhler | |
| 11,419,204 | B2 | * | 8/2022 | Suckewer ............. | F02P 3/0807 |
| 2002/0170547 | A1 | | 11/2002 | Lepley | |
| 2003/0154954 | A1 | | 8/2003 | Vogel et al. | |
| 2005/0000500 | A1 | | 1/2005 | Goede | |
| 2005/0000655 | A1 | | 1/2005 | Wi | |
| 2005/0016511 | A1 | | 1/2005 | Romero et al. | |
| 2006/0137354 | A1 | | 6/2006 | Ponziani et al. | |
| 2007/0062502 | A1 | | 3/2007 | Suckewer et al. | |
| 2008/0141967 | A1 | | 6/2008 | Tani et al. | |
| 2009/0194513 | A1 | | 8/2009 | Suckewer et al. | |
| 2011/0309749 | A1 | | 12/2011 | Suckewer et al. | |
| 2014/0091712 | A1 | | 4/2014 | Suckewer et al. | |
| 2014/0232256 | A1 | | 8/2014 | Suckewer | |
| 2016/0381779 | A1 | | 12/2016 | Suckewer et al. | |
| 2017/0085059 | A1 | | 3/2017 | Suckewer | |
| 2017/0105275 | A1 | | 4/2017 | Suckewer et al. | |
| 2018/0359844 | A1 | | 12/2018 | Suckewer et al. | |
| 2018/0368247 | A1 | | 12/2018 | Suckewer et al. | |
| 2019/0027903 | A1 | | 1/2019 | Suckewer | |
| 2020/0367352 | A1 | | 11/2020 | Suckewer et al. | |
| 2020/0373742 | A1 | | 11/2020 | Suckewer et al. | |
| 2021/0059038 | A1 | | 2/2021 | Suckewer et al. | |
| 2022/0173577 | A1 | | 6/2022 | Suckewer et al. | |
| 2023/0114936 | A1 | | 4/2023 | Suckewer et al. | |

FOREIGN PATENT DOCUMENTS

| | | | |
|---|---|---|---|
| GB | 2 085 076 | A | 4/1982 |
| JP | 57-140567 | A | 8/1982 |
| WO | WO 88/04729 | A1 | 6/1988 |

(56) References Cited

FOREIGN PATENT DOCUMENTS

| | | | |
|---|---|---|---|
| WO | WO 91/15677 | A1 | 10/1991 |
| WO | WO 93/10348 | A1 | 5/1993 |
| WO | WO 01/20160 | A1 | 3/2001 |
| WO | WO 2009/105273 | A1 | 8/2009 |

OTHER PUBLICATIONS

International Search Report and Written Opinion for International Application No. PCT/US2006/014840 dated Aug. 8, 2006.
International Search Report and Written Opinion for International Application No. PCT/US2012/048423 dated Dec. 20, 2012.
*U.S. Appl. No. 18/334,806, filed Jun. 14, 2023, Suckewer.
U.S. Appl. No. 18/334,806, Suckewer, filed Jun. 14, 2023.

* cited by examiner

METHOD AND APPARATUS FOR OPERATING TRAVELING SPARK IGNITER AT HIGH PRESSURE

CROSS-REFERENCE TO RELATED APPLICATIONS

This application is a continuation of U.S. patent application Ser. No. 16/711,083, filed Dec. 11, 2019, which in turn is a continuation of U.S. patent Ser. No. 15/932,360 filed Feb. 16, 2018, which in turn is a continuation of U.S. patent Ser. No. 15/186,319, filed Jun. 17, 2016, which in turn is a continuation of U.S. patent Ser. No. 14/933,938, filed Nov. 5, 2015, which in turn is a continuation of U.S. patent Ser. No. 14/094,922, filed Dec. 3, 2013, which in turn is a continuation of U.S. patent Ser. No. 13/222,298 filed Aug. 31, 2011, now allowed, which in turn is a continuation of U.S. patent application Ser. No. 12/313,927 filed Nov. 26, 2008, now pending, which in turn is a continuation of U.S. patent application Ser. No. 11/407,850 filed Apr. 19, 2006, now U.S. Pat. No. 7,467,612, issued Dec. 23, 2008, which claims the benefit, under 35 USC 119(e) of prior U.S. provisional patent application Ser. No. 60/672,892, filed Apr. 19, 2005, the entire contents of all of which are incorporated herein by reference in their entireties.

BACKGROUND

Field

This invention relates to the fields of plasma generation, ignitions, and internal combustion (IC) engines. In particular, it relates, but is not limited, to ignition methods and ignition apparatus for use therein; and, specifically, to ignition methods and apparatus for various applications, including but not limited to, high pressure engines. More particularly, some aspects relate to the delivery of discharge current to traveling spark igniters in order to maximize their performance and longevity, especially in internal combustion engines operating at high pressures.

Discussion of Related Art

For a variety of reasons, there is interest today in increasing the pressures in internal combustion engines and similar combustion environments, with a concomitant need for ignition sources capable of operating in these environments. For example, automobile companies and manufacturers of internal combustion engines would like to be able to provide vehicles which have IC engines which operate at much higher pressures than conventional internal combustion engines. To date, however, there has not been an effective and practical ignition system for such engines. Among other concerns are longevity of igniters (spark plugs) and reliability of igniter firing.

The traveling spark igniter (TSI) is a device that has been discussed as a promising spark plug replacement for internal combustion engines, but previously not for high pressure engines. TSIs have, for example, been shown in a number of prior patents including, for example, U.S. Pat. Nos. 6,321,733 and 6,474,321, both assigned to the same assignee as this invention and incorporated by reference in their entireties for their explanations of TSI devices and ignition systems.

Briefly, a TSI-based ignition system provides a large plasma kernel which is propagated along the igniter's electrodes by Lorentz force (along with thermal forces, to lesser degrees) and propelled into a combustion chamber. The Lorentz force acting on the ignition kernel (i.e., plasma) is created by way of the discharge current in the plasma interacting with a magnetic field caused by that same current in the electrodes of the igniter. The magnitude of the Lorentz force is proportional to the square of that current. In engines operating at normal pressures (i.e., a maximum of about 120 psi), traveling spark igniters provide significant advantages over conventional spark plugs due to the large plasma volume they generate, typically some 100-200 times larger than in a conventional spark plug, for comparable discharge energy. Increased efficiency and reduced emissions are attainable.

For higher engine operating pressures, however, the breakdown voltage required for initiating the discharge between the electrodes of the igniter is significantly higher than in engines operating at conventional pressures. This creates problems for TSIs, as for any spark plug. The electrodes in a TSI, as in a conventional spark plug, are maintained in a spaced apart relationship by a member called an isolator, which is formed of an insulating material such as a ceramic. The higher breakdown voltage causes problems for both the isolator and the electrodes.

Along the surface of the isolator running between the electrodes, the breakdown voltage is lower than it is further along the electrodes in a TSI, or in any conventional spark plug with a similar gap between the electrodes. Indeed, this difference in breakdown voltages varies directly with increasing pressure in the combustion chamber. Consequently, although the breakdown voltage along the isolator surface increases with pressure, that increase is less than the increase in the breakdown voltage between the exposed part of the electrodes away from the isolator surface. When breakdown occurs (as a result of which the resistance through the plasma rapidly drops), the current rises rapidly and a very large current is conducted in the forming plasma along the isolator surface, thus giving rise to the Lorentz force acting on the plasma. Such rapidly rising current, though, creates not only a very high temperature plasma, but also a powerful shock wave in the vicinity of the surface of the isolator. The larger the current, the more rapid the plasma expansion and the resulting shock wave. These combined effects can cause deformation and/or breakage of the isolator.

Additionally, the high current produces very rapid erosion of the electrodes in the vicinity of the isolator surface, where they are attacked by the high current, thermal heating and thermionic emission that results therefrom.

Similar problems have been manifest with igniters based on the University of Texas "railplug" design which generates a Lorentz force in a plasma traveling along a high aspect ratio discharge gap (as contrasted with a TSI, which has a low aspect ratio discharge gap).

Although both the railplug and the TSI generate significant plasma motion at relatively low pressures, when the combustion chamber pressure is increased to a high pressure, the plasma behaves differently and it is this difference in behavior that leads to unsatisfactory results. In a low pressure environment, the force exerted on the plasma by the pressure is relatively small. The plasma moves easily along the electrodes in response to the Lorentz force. As the ignition chamber pressure is increased, however, that pressure provides a force of significant magnitude that resists the Lorentz force and, thus, plasma motion. Consequently, the plasma tends to become more concentrated, and to collapse on itself; instead of having a diffused plasma cloud, a very localized plasma—an arc—is formed between the electrodes below a certain current threshold. This arc, though occupying a much smaller volume than the plasma cloud of the low-pressure case, receives similar energy. As a result, the current density is higher and at the electrodes, where the arc exists, there is a higher localized temperature and more power density at the arc-electrode interfaces. That is, the current density is quite high at those interfaces, producing more localized heating of the electrodes than in the low pressure environment. The localized heating of the electrodes, in turn, produces thermionic emission of electrons and ions. The observed effect is that the arc appears to "attach" itself at relatively fixed locations on the electrodes, producing erosion of the electrodes as the entire discharge energy is deposited at the "attachment point;" this is to be contrasted with the low pressure environment where a lower density, diffused area of plasma contact moves along the electrodes without significantly damaging them.

Concurrently, the plasma, affected by the Lorentz and thermal forces, bows out from the arc attachment points. This causes the magnetic field lines to no longer be orthogonal to the current flow between the electrodes, reducing the magnitude of the Lorentz force produced by a given current. So, in addition to the other problems, there is a loss in motive force applied to the plasma.

Overall, there is a reduction in plasma motion as compared with the lower pressure environments, and dramatically increased electrode wear at the arc attachment points.

Accordingly, a variety of needs exist, including needs for plasma generators, in general, needs for improved ignition systems, needs for ignition systems for use in internal combustion engines and needs for an ignition system and method which generates a large ignition kernel and which is usable with high pressure engines, and is commercially practical.

If a traveling spark igniter is to be used in a high pressure combustion environment, a need further exists to overcome the above negative effects on the isolator material and electrodes of the igniter. See U.S. Pat. Nos. 5,704,321, 6,131,542, 6,321,733, 6,474,321, 6,662,793, and 6,553,981, for example, incorporated by reference herein. That is, a need exists for an igniter and ignition system for use in high pressure combustion engines, wherein the isolator and electrodes exhibit substantial lifetimes (preferably comparable to that of conventional spark plugs in low pressure engines) without being destroyed by the discharge process. Desirably, such a traveling spark igniter and ignition system will be usable and useful in internal combustion engines operating not only at high and very high pressures (i.e., several hundred psi), but also at lower, conventional pressures.

SUMMARY

The above and other needs are addressed, and advantages provided, with a new method, and corresponding apparatus, for generating and sustaining a plasma, operating a traveling spark igniter and providing an ignition for internal combustion and other engines, particularly high pressure internal combustion engines. Typically, a high initial breakdown voltage is applied to the igniter to initiate a plasma kernel in a plasma initiation region of the igniter, but preferably at a current lower than that previously employed with TSI ignitions, as the breakdown current need not produce a large Lorentz force. After the breakdown current pulse, various mechanisms may be employed to prolong the plasma while recombination is occurring and to allow the plasma to become easily detached (or detachable) from the initiation region (typically, on or adjacent the surface of an isolator between the igniter electrodes. Before the plasma has a chance to recombine completely, the current is turned on again to provide a short follow-on pulse of energy (preferably at a current substantially less than that of the breakdown pulse). The follow-on current pulse generates a corresponding pulse of Lorentz force to move the plasma away from its previous location, further along the electrodes of the igniter. A number of such follow-on pulses may be provided, with an "off" interval between successive pulses, during which interval one or more mechanisms prolong the plasma and allow only partial recombination of the plasma. This is called "simmering." Prior to total recombination of the plasma, the next follow-on pulse of current "kicks" the plasma even further along the electrodes; and the final follow-on pulse ejects the plasma from the electrodes. One mechanism for producing simmering is to reduce the current through the igniter to a relatively low (but non-zero) level, called a "simmer current." Alternatively, if a summer current is not applied, similar effects may be obtained by using any of a number of other techniques for prolonging recombination and preventing "total" recombination of the plasma kernel by the time the next follow-on pulse arrives. For example, the follow-on pulses may be timed and possibly even waveform-shaped to more closely follow each other so that only partial recombination occurs between pulses; or each follow-on pulse may be preceded by a high sub-breakdown voltage; or the plasma may be excited by RF or laser energy. That is, numerous ways are contemplated of preventing total plasma recombination. By "total" in reference to recombination is meant that the plasma effectively has been extinguished and high energy is needed to reignite it.

The invention is manifested in several ways, or aspects, and example implementations are presented below. Other ways of practicing the invention will become apparent to those skilled in the art. The various aspects may be practiced alone or in any of many combinations, all of which cannot be reasonably enumerated here. It is intended that features of various embodiments be practiced in combinations other than those illustrated, not all features being shown in connection with all embodiments, for brevity.

Aspects of the invention include the following, at least:

A method of plasma generation, comprising applying a high voltage to an igniter, said high voltage being of amplitude sufficient to cause breakdown to occur between the electrodes, resulting in a high current electrical discharge in the igniter in an initiation region, and formation of a plasma kernel adjacent said initiation region; and following breakdown, applying to said electrodes a sequence of at least two relatively lower voltage follow-on pulses, whereby the plasma kernel is forced to move toward a free end of said electrodes by said follow-on pulses.

A method of plasma generation, comprising applying a high voltage to an igniter, said high voltage being of amplitude sufficient to cause breakdown to occur between the electrodes, resulting in a high current electrical discharge in the igniter in an initiation region, and formation of a plasma kernel adjacent said initiation region; and following breakdown, applying to said electrodes a sequence of one or more relatively lower voltage follow-on pulses of current sufficiently low as to maintain a diffuse attachment of the current arc to the electrodes, whereby the plasma kernel is forced to, and can, move toward a free end of said electrodes under the influence of said follow-on pulses.

The initiation region may be on or adjacent the surface of an isolator disposed between said electrodes. A current of the follow-on pulses, for an internal combustion engine, may be between about 3 and 450 Amperes. The method may include preventing total kernel recombination of the plasma prior to at least one follow-on pulse. This may be done in various was, including between pulses of the sequence, maintaining a simmer current between the igniter electrodes sufficient to prevent total recombination of the plasma kernel. It also may include, in an interval between follow-on pulses, for at least part of said interval maintaining a voltage across electrodes of the igniter below a breakdown voltage but sufficient to sustain enough current to prevent total recombination before the end of the interval. The igniter may be a traveling spark igniter. Successive pulses in said sequence are separated by intervals of about 2-600 microseconds and preferably about 20-250 microseconds, most preferably 50-100 microseconds. Each of said follow-on pulses may have a maximum amplitude of about 3-450 Amperes. The amplitudes may not be uniform. The follow-on pulses may have a maximum amplitude of about 20-120 Amperes, which may not be uniform. Each of said follow-on current pulses preferably may have an average duration of less than about 200 microseconds, which may not be uniform. The follow-on pulses may have an amplitude of about 10-5000 V and preferably about 20-275 V. The follow-on pulses need not all have the same polarity of voltage and current and the currents of the follow-on pulses need not be constant.

A fuel ignition method, comprising applying a high voltage to an igniter in the presence of a combustible fuel, said high voltage being of amplitude sufficient to cause breakdown to occur between the electrodes of the igniter, resulting in a high current electrical discharge in the igniter in an initiation region, and formation of a plasma kernel adjacent said initiation region; and following breakdown, applying to said electrodes a sequence of two or more relatively lower voltage follow-on pulses, whereby the plasma kernel is forced to move toward a free end of said electrodes by said follow-on pulses. The initiation region may be on or adjacent the surface of an isolator disposed between said electrodes. The igniter may be in an internal combustion engine. A current of the follow-on pulses for a gasoline-fueled internal combustion engine, may be between about 3 and 450 Amperes. Preferably, said method includes preventing total kernel recombination of the plasma prior to a follow-on pulse.

Preventing total recombination may include, between pulses of the sequence, comprises maintaining a current (termed a simmer current) through the plasma kernel sufficient to prevent total recombination of the plasma kernel. Preventing total recombination of the plasma kernel also may include, in an interval between follow-on pulses, for at least part of said interval maintaining a voltage across electrodes of the igniter below a breakdown voltage but sufficient to sustain enough current through the plasma to prevent total recombination before the end of the interval.

Follow-on pulses need not all have the same polarity of voltage and current, which need not be constant.

The igniter may be in an internal combustion engine in which there is a relatively high pressure at the time of ignition.

The methods may further include, after a follow-on pulse, re-triggering or re-striking the plasma kernel at a time an ionization level of the plasma kernel has fallen below a desired level, with a current and at a relatively low voltage sufficient to cause the plasma kernel to grow before total recombination occurs, followed by a next follow-on pulse.

The methods also may include simmering the plasma kernel between at least some follow-on pulse pairs.

An ignition circuit for powering an igniter in an internal combustion engine, comprising means for providing a high voltage capable causing an electrical breakdown discharge, at a high current, between electrodes of an igniter, in an initiation region between said electrodes, when said igniter is disposed in a fuel-air mixture of an engine, whereby a plasma kernel is formed in said region by said discharge; and means for providing a sequence of one or more relatively lower voltage and lower current pulses having voltage and current amplitude and timing sufficient to force the plasma kernel to move toward a free end of said electrodes by said lower voltage, lower current pulses. The means for providing a high voltage capable of causing electrical breakdown discharge may include a high voltage, low inductance ignition coil having a primary winding and a secondary winding, the secondary winding having a lead for connection to one electrode of an igniter, and a circuit for triggering a signal in the primary winding to induce a high voltage pulse in the secondary winding. The means for providing a sequence of relatively low voltage pulses may comprise a relatively low voltage source and, for each said pulse, a capacitor charged by the relatively low voltage source and a pulse transformer having a secondary winding connected to said lead and a primary winding through which the capacitor is discharged in response to a trigger signal, inducing said pulse in said lead. The ignition circuit may further include means for providing to the igniter, in an interval between the breakdown discharge and a first follow-on pulse a simmer current sufficient to prevent total recombination of the plasma kernel in said interval. It also may include means for providing to the igniter, in an interval between each successive pair of follow-on pulses a simmer current sufficient to prevent total recombination of the plasma kernel in said interval. The ignition coil preferably includes a saturable core on which the primary and secondary windings are formed and the core substantially saturates when said electrical breakdown occurs, whereby the secondary winding thereafter has substantially reduced inductance.

An ignition circuit for powering an igniter in an internal combustion engine, comprising a high voltage pulse generator which generates on an output for connection to an igniter a pulse whose maximum voltage, when delivered to the igniter, is capable causing a breakdown discharge and consequent high current between electrodes of the igniter, in an initiation region between the electrodes, when said igniter is disposed in a fuel-air mixture, whereby a plasma kernel is formed adjacent said surface by said discharge; and a lower voltage pulse generator which generates on the output a sequence of one or more relatively lower voltage and lower current follow-on pulses having voltage and current amplitude and timing sufficient to force the plasma kernel to move toward a free end of said electrodes by said lower voltage, lower current pulses. There may also be included a simmer current source which supplies on the output line, in an interval between the breakdown discharge and a first follow-on pulse a simmer current sufficient to prevent total recombination of the plasma kernel in said interval. As well, there may be a voltage source which maintains between follow-on pulses, for at least a portion of an interval between said follow-on pulses, a voltage on the igniter electrodes below a breakdown voltage but sufficient to prevent total recombination of the plasma kernel during said interval.

An ignition circuit substantially as shown and described in the drawing figures, particularly any of FIGS. 8-10.

The ignition circuit also may include means operable after a follow-on pulse, for re-triggering or re-striking the plasma kernel at a time an ionization level of the plasma kernel has fallen below a desired level, with a current and at a relatively low voltage sufficient to cause the plasma kernel to grow before total recombination occurs, followed by a next follow-on pulse.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
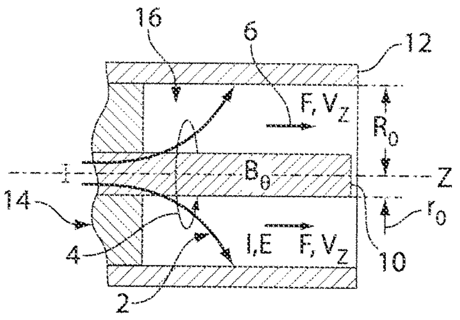
Fig. 1 (Prior Art)
FIG. 1 is a schematic illustration, in cross section, of a prior art traveling spark igniter, illustrating the principle of its operation.

Herein are explained in greater detail numerous aspects of the invention; the problems addressed by the invention, in greater detail than above; and a single embodiment of an example of an ignition circuit for practicing aspects of the invention.

According to a first aspect, there will be shown a method of operating an igniter in an internal combustion engine, comprising: applying a high voltage to electrodes of the igniter, said high voltage being of amplitude sufficient to cause electrical discharge breakdown to occur between the electrodes, in an initiation region (e.g., over a surface of an isolator) between the electrodes, resulting in a high current electrical discharge in the igniter, and formation of a plasma kernel in an air or fuel-air mixture adjacent said surface; and following breakdown, applying to said electrodes (preferably a simmer current) and a sequence of one or more lower voltage and lower current pulses, whereby the plasma kernel is forced to move toward a free end of said electrodes by said lower voltage, lower current pulses.

Between breakdown and a first pulse of the sequence, and between pulses of the sequence, a current desirably is maintained through the plasma kernel sufficient to prevent total recombination of the plasma. Alternatively, such a current need not be maintained, if the intervals between breakdown and the first pulse of the sequence, and between additional follow-on pulses of the sequence, are sufficiently short, such that total recombination does not occur prior to the start of such pulses. (If total recombination occurs, then a high breakdown voltage is needed to restart the plasma formation process.) If total recombination is avoided (no matter how) before the start of a follow-on pulse, the follow-on pulse can be a relatively low current pulse (compared to a number of previous approaches, but still appreciable) and it will still provide a suitable Lorentz force to advance the plasma, and it will, itself, create a current arc that can move along the electrodes. As another alternative, recombination can be slowed by imposing a relatively high (but less than breakdown) voltage across the electrodes prior to the start of a follow-on pulse. All three mechanisms facilitate the establishment of a moving plasma kernel without requiring re-generation of a high energy breakdown condition, reducing the tendency of the current path to "re-attach" to the electrodes at fixed locations. The number of follow-on pulses varying according to design requirements and/or operating conditions.

The igniter is preferably a traveling spark igniter.

Desirably, a first pulse of the sequence follows the breakdown discharge by an interval of from about 2 to about 100 microseconds, preferably from about 10 to about 20 microseconds, but this will depend on the recombination time for a plasma in the particular kind of fuel mixture being employed. Desirably, each of said follow-on pulses has a maximum amplitude of about 5-200 Amperes. But the amplitudes need not be uniform. Preferably, said lower voltage, lower current pulses have a maximum amplitude of about 25-105 Amperes, and more preferably about 40-80 Amperes. The pulses may have a duration of from about 2 to about 200 microseconds. Successive pulses in said sequence preferably are separated by intervals of about 10-500 microseconds and even more preferably, 40-120 microseconds, but the intervals may not be uniform. In terms of voltage, each of said pulses typically may have an amplitude of about 50-5000 V and, more preferably, about 300-500 V. All pulses need not have the same polarity of voltage or current; and neither the voltage nor the current in a pulse need be constant. The foregoing numbers are all representative only and are not intended to reflect any inherent limits on the invention. Other ranges may be employed in appropriate embodiments. These numbers may be useful, though, as an aid to identifying differences with other ignition systems and methods.

The invention is intended for use in high pressure engines, but is not so limited.

According to a related aspect, an ignition circuit is provided for powering an igniter in an internal combustion engine, the circuit comprising means for providing a high voltage capable of causing a breakdown discharge, at a relatively high current (but preferably lower than prior TSI ignitions have used), between electrodes of an igniter, and in an initiation region (e.g., on or over a surface of an isolator which separates the electrodes), when said igniter is disposed in a fuel-air mixture, whereby a plasma kernel is formed adjacent said surface by said discharge; and means for providing a sequence of one or more relatively lower voltage and lower current follow-on pulses having voltage and current amplitude and timing sufficient to create Lorentz force pulses causing the plasma kernel to move toward a free end of said electrodes by said follow-on pulses. The means for providing a high voltage capable of causing breakdown may include a high voltage, low inductance ignition coil having a primary winding and a secondary winding, the secondary winding having a lead for connection to one electrode of an igniter, and a circuit for triggering a signal in the primary winding to induce a high voltage pulse in the secondary winding.

The means for providing a sequence of relatively lower voltage (i.e., sub-breakdown voltage) pulses may comprise a low voltage source and, for each said pulse, a capacitor charged by the low voltage source and a pulse transformer having a first winding connected to said lead and a second winding through which the capacitor is discharged in response to a trigger signal, inducing said pulse in said lead. The ignition circuit may further include means for providing to the igniter, in an interval between the breakdown discharge and a first lower voltage pulse a simmer current sufficient to prevent total recombination of the plasma kernel in said interval. It also may include means for providing to the igniter, in an interval between successive follow-on pulses a simmer current sufficient to prevent total recombination of the plasma kernel in said interval. Alternatively the means for providing a sequence of relatively low voltage pulses includes means for providing pulses separated in time by an interval sufficiently short that total recombination of the plasma kernel does not occur in said interval. As another alternative, the means for providing a sequence of relatively low voltage pulses may comprise a means for preceding each such follow-on pulse by a high, sub-breakdown voltage.

According to a further aspect, an ignition circuit is shown for powering an igniter in an internal combustion engine, the circuit comprising a high voltage pulse generator which generates on an output for connection to an igniter a pulse whose maximum voltage, when delivered to the igniter, is capable causing a breakdown discharge, at a high current, in an initiation region between electrodes of the igniter (e.g., adjacent a surface of an isolator which separates the electrodes), when said igniter is disposed in a fuel-air mixture, whereby a plasma kernel is formed adjacent said surface by said discharge; and a low voltage pulse generator which generates on the output a sequence of one or more lower voltage and lower current pulses having voltage and current amplitude and timing sufficient to force the plasma kernel to move toward a free end of said electrodes by said lower voltage, lower current pulses. The ignition circuit may further include a simmer current source which supplies on the output, in an interval between the breakdown discharge and a first lower voltage pulse, a simmer current sufficient to prevent total recombination of the plasma kernel in said interval. Alternatively, the circuit may include a follow-on pulse generator that supplies, on the output, follow-on pulses which follow each other so closely (i.e., are separated by a sufficiently short interval) that total recombination of the plasma does not occur in the interval between such pulses. As another alternative, the circuit may include a pulse source providing a sequence of relatively low voltage pulses and a high voltage source which provides, preceding each such follow-on pulse, a sub-breakdown high voltage sufficient to delay total recombination such that total recombination has not occurred when the relatively low voltage pulse starts.

Thus, this invention is not limited in its application to the details of construction and the arrangement of components set forth in the following description or illustrated in the drawings. The invention is capable of other embodiments and of being practiced or of being carried out in various ways. Any embodiments are presented by way of example only. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

It is useful, now, to attempt to better understand the problems encountered when one attempts to operate an igniter in a high pressure engine. A traveling spark igniter (TSI) is an ignition device which is in the nature of a small plasma gun. A typical TSI is illustrated in FIG. 1, taken from U.S. Pat. No. 6,321,733. An isolator (e.g., ceramic) material 14 maintains electrode spacing. A plasma 16 is created along the surface of the isolator, due to a high voltage breakdown process occurring there. As the discharge current passes through the plasma, the temperature and volume of the plasma increase, leading to a further decrease in plasma resistivity and resistance. This increases the current in the plasma, which is limited primarily by the impedance of the electrical discharge circuit that produces the current supplied to the igniter.

Figure 2:
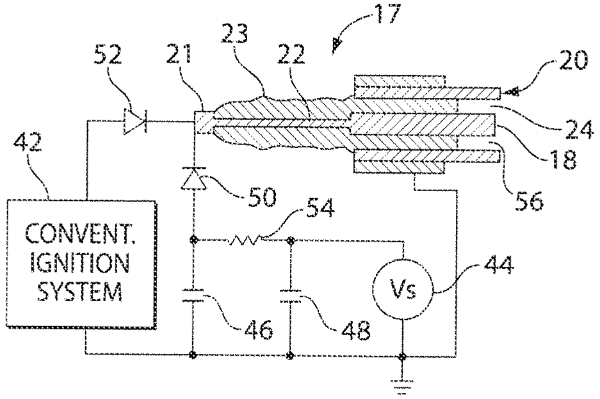
Fig. 2 (Prior Art)
FIG. 2 is a part-schematic, part-block diagram of a typical prior art ignition circuit for the TSI of FIG. 1.
Figure 3:
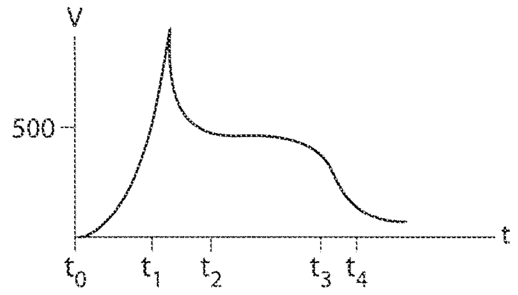
Fig. 3 (Prior Art)
FIG. 3 is a generalized representation of the voltage between the electrodes of an igniter as shown in FIG. 1, using an ignition circuit of the type shown in FIG. 2.

A typical ignition circuit for operating a TSI is shown in FIG. 2, which is also taken from U.S. Pat. No. 6,321,733. The circuit consists of two main parts: (1) a conventional ignition system 42 and (2) a follow-on current generator comprising capacitors such as 46 and 48, a low voltage power supply 44 and diode 50. The conventional ignition system 42 provides a high voltage for creating a breakdown (at a high current) in the spark gap along the isolator surface 56 between the electrodes 18 and 20, to form an initial plasma in the gaseous combustion mixture near that surface. The follow-on current generator provides a current through the initial plasma, in the spark gap, after breakdown discharge, forming a much larger plasma volume. Resistor 54 may (but need not) be used to limit the maximum current from capacitor 48. A typical voltage discharge profile (not to scale) is shown in FIG. 3, taken from U.S. Pat. No. 6,474,321.

The conventional ignition system 42 initiates discharge in the discharge gap at time $t=t_0$. As a result, the voltage in a secondary coil in the high voltage (HV) ignition transformer therein rises until it reaches the breakdown voltage in the spark gap at $t=t_1$. After breakdown occurs at $t=t_1$ the voltage across the discharge gap drops rapidly to value of about 500 volts or less at $t=t_2$, corresponding to low plasma resistivity. The voltage is substantially constant until a time $t=t_3$, when just about all the energy from capacitors 46 and 48 has been transferred, following which the voltage and current rapidly diminish to a near-zero value at time $t=t_4$. For simplicity, we shall assume that the interval from $t_3$ to $t_4$ is negligibly short. The interval $\Delta t=t_3-t_2$ is related to the energy stored in capacitors 46 and 48 as well as the voltage of the follow-on current through the discharge gap after breakdown occurred. The following energy balance equation relates the variables:

$$\frac{1}{2}C\left(V_{t_2}^2 - V_{t_4}^2\right) = \int_{t_2}^{t_4} V(t)i(t)dt$$

where V(t) is the voltage as a function of time, between the electrodes defining the discharge gap, such voltage having an initial value $V_{t_2}$ at time $t_2$ and a final value $V_{t_4}\approx 0$ at $t>t_4$, i(t) is the current in the spark gap as a function of time and C is the sum of the discharging capacitance (here, the sum of capacitances of capacitors 46 and 48). In the time interval $\Delta t=t_3-t_2$, one can assume, as a first approximation, that $V(t)\approx V_0$ and is roughly constant, therefore, $V_{t_2}^2-V_{t_4}^2\approx V_0^2$. If one further assumes that the plasma resistivity is constant, one can make the assumption $i(t)\approx i_0$. One can use these simplifying assumptions to obtain a basic relationship between $\Delta t$ ($\Delta t\approx t_4-t_2$ because $t_4-t_3<<\Delta t$) and the circuit parameters described by C, $V_0$, and $i_0$:

$$\Delta t=CV_0/2i_0$$

This simple relationship provides information about pulse duration as a function of capacitance and average current $i_0$ during discharge, for a given operating (relatively low) voltage $V_0$ on the capacitors. For a given energy provided to the igniter (hence, given $V_0$ and C), this relationship teaches that for current $i_0$ to increase, the pulse duration $\Delta t$ has to decrease. However, increasing current $i_0$ also increases the Lorentz force $F_L$. Increasing the Lorentz force moves the plasma away from the isolator surface faster, toward the end of the electrodes, into the combustion chamber of the engine. Pressure in the combustion chamber, however, provides a countervailing pressure force $F_p$ in the igniter. Force $F_p$ works against the Lorentz force preventing the speed of the plasma from increasing above some limiting value, independent of the length $\ell$ of the electrodes (i.e., $\ell$ is the distance between the surface of the isolator and the free end of electrodes facing into the combustion chamber).

The net force available to move the plasma is the difference between the Lorentz force $F_L$ and the pressure force $F_p$ (assuming one can ignore the thermal force on the plasma as it is significant only at the earlier stages of plasma propagation and diminishes quickly as the plasma moves away from the isolator surface). It is useful to develop a model of the forces in order to understand how to overcome the pressure force. The Lorentz force $F_L$ can be represented as a magnetic pressure $p_B$ on the plasma, given by the well-known relationship $p_B=B^2/8\pi$, multiplied by the effective plasma surface area, $S_{p\ell}$:

$$F_L=\frac{B^2}{8\pi}S_{p\ell}$$

The gas pressure force Fp can be presented in the form $F_p=p\ S_{p\ell}$, where p is the effective gas pressure from the combustion mixture (facing the plasma during its movement). Hence, one can write the equation for the net force governing plasma movement can be presented as:

$$(F_L-F_p)=m_{p\ell}\cdot d\upsilon_{p\ell}/dt,$$

where $\upsilon_{p\ell}$ is plasma velocity and $m_{p\ell}$ is plasma mass. In turn, plasma mass can be presented as the product of plasma mass density $\rho_{pl}$ and plasma volume $V_{p\ell}=S_{p\ell}\Delta\ell_{p\ell}$, where $\Delta\ell_{p\ell}$ is a fraction representing the portion of the electrode length occupied momentarily by the plasma.

The net force equation can be simplified, and useful relationships derived from it, by making some rough assumptions. One can assume that the plasma volume, after its formation, is constant as the plasma propagates along the electrodes; thus, $S_{p\ell}\ \Delta\ell_{p\ell}$ and $\rho_{pl}$ are constant and forces $F_L$ and $F_p$ are also constant. Then, by integrating one obtains:

$$(F_L-F_p)\Delta t\approx\rho_{p\ell}\,\Delta\ell_{p\ell}S_{p\ell}\,\upsilon_{p\ell},$$

where it was assumed that the initial plasma velocity $v_{t2}$ was much smaller than its final velocity, $\upsilon_{p\ell}$.

Replacing $F_L$ by $B^2$ where $B=\sqrt{8\pi\alpha}i$ and $\alpha$ is a constant coefficient, and $F_p$ as above, we obtain $$(\alpha i_0^2-p)\Delta t=\rho_{p\ell}\,\Delta\ell_{p\ell}\,\upsilon_{p\ell}$$

Because ½ $\Delta t\ \upsilon_{p\ell}\approx\ell$, we can write $$\Delta t=\frac{1}{i_0}\left(\frac{2\ell\rho_{p\ell}\Delta\ell_{\ell p}/\alpha}{1-p/\alpha i_0^2}\right)^{1/2}$$

From this equation, one observes that for relatively small pressure (i.e., $p<<\alpha i_0^2$), $\Delta t\ i_0\approx$constant; and in this range of parameters, increasing $i_0$ leads to decreasing $\Delta t$. Then from the above relationships, one can see that the plasma can be moved faster with increasing $i_0$ without really increasing the discharge energy (of course, this is only true for $\rho_{p\ell}\Delta\ell_{p\ell}\approx$const.; with increasing $i_0$, $\rho_{p\ell}\Delta\ell_{p\ell}$ may also increase, so some additional energy may be required).

However, when it is not true that $p<<\alpha i_0^2$ (i.e., the assumption fails), then increasing pressure p could lead to $p/\alpha i^2\geq 1$ and the plasma could stop moving altogether. In such a case, it will be necessary to increase $i>i_0$ to the point that $p/\alpha i^2<1$. This requires a significant increase in energy, though, due to increased $\Delta t$ and i.

Recombination processes in the plasma pose a further hurdle. The front portion of the hot plasma that is in contact with a relatively cold combustion mixture cools rapidly. The plasma recombination rate at high pressure is a function of plasma temperature, T, that varies as $1/T^{3/2}$. Hence, at low temperature, plasma recombination occurs very fast at its propagation front where it interacts with the cold gaseous mixture. At high pressures, such recombination rate could be as fast as the plasma propagation velocity, meaning that the Lorentz force—induced movement would be entirely negated by the speed of recombination, effectively causing the plasma to stand still. In such a situation, the net plasma velocity along the electrodes is substantially zero and the plasma will seem to stay near the surface of the isolator during the entire discharge. The plasma, of course, recombines near the surface of the isolator, as well, though at a much slower rate because the gas there is much hotter than at the plasma's front edge. Consequently, plasma resistivity near the isolator surface is lower than at the front edge of the plasma and most of the discharge current will be concentrated in that region, preventing further plasma recombination near the isolator.

As shown above, increasing operating combustion chamber pressure lowers the net motive force on the plasma so it moves more slowly and the time it takes for the plasma to move to the combustion chamber thus increases. Therefore, for sufficiently large pressures, the plasma may never succeed in reaching the end of the igniter.

To prevent the plasma from slowing down so much, the discharge current has to be raised, in order to increase the energy being fed into the plasma. The increased energy input, though, is concentrated near the isolator. That is quite problematic. There are thermal stresses imposed on the isolator and shock waves are generated that can damage the isolator. There are also large thermal effects on the portions of the electrodes near the isolator. Assuming the ignition circuit supplies sufficient energy to create a net force that will effectively move the plasma, then the higher the pressure in the combustion chamber, the worse the negative effects on the isolator and electrodes. These conditions decrease isolator and electrode longevity in high pressure environments, unless something is done to prevent those negative impacts.

The problem of decreasing longevity of traveling spark igniters with increasing gas (i.e., combustion mixture) pressure is significantly decreased, or even eliminated, at least in part by decreasing the difference between the speed of recombination at the front of the plasma (facing the combustion chamber) and the back of the plasma (facing the isolator). By making plasma recombination more symmetrical, a significant net force on the plasma is directed into the combustion chamber.

Figure 4:
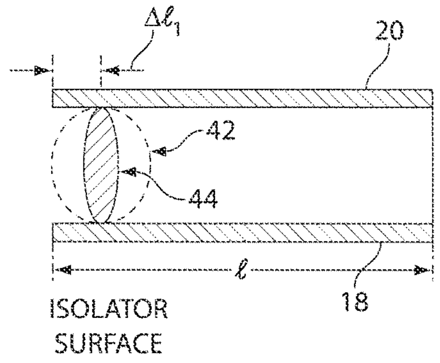
FIG. 4 is a diagrammatic illustration of the creation of a plasma cloud by a current pulse in a TSI, and the subsequent collapse of the plasma, in a TSI operating in a high pressure environment.

FIG. 4 diagrammatically illustrates the problem. A relatively short first current pulse forms a volume of plasma 42, as indicated by the dashed line. During that first pulse, the center of the plasma moves to the right, away from isolator 14, under the influence of the Lorentz force. As the pulse is of relatively short duration, neither the isolator surface nor the gas near the surface is heated significantly. Therefore, after the first current pulse ends, the plasma recombines at its back (left) side and its front (right) side fairly symmetrically, leaving a relatively narrow plasma kernel 44. The narrow plasma kernel still can support an arc, as explained above.

The present invention improves the symmetry of plasma recombination by using a different approach to energizing the igniter. Several short current discharge bursts (follow-on pulses) are applied after the breakdown pulse, between times $t_2$ and $t_3$. The follow-on pulses have moderately high peak current amplitude, but significantly less than the breakdown pulse. Between the breakdown pulse and the first follow-on pulse, and between follow-on pulses, the (simmer) current preferably is maintained at a low, non-zero value, to prevent total recombination.

Figure 5:
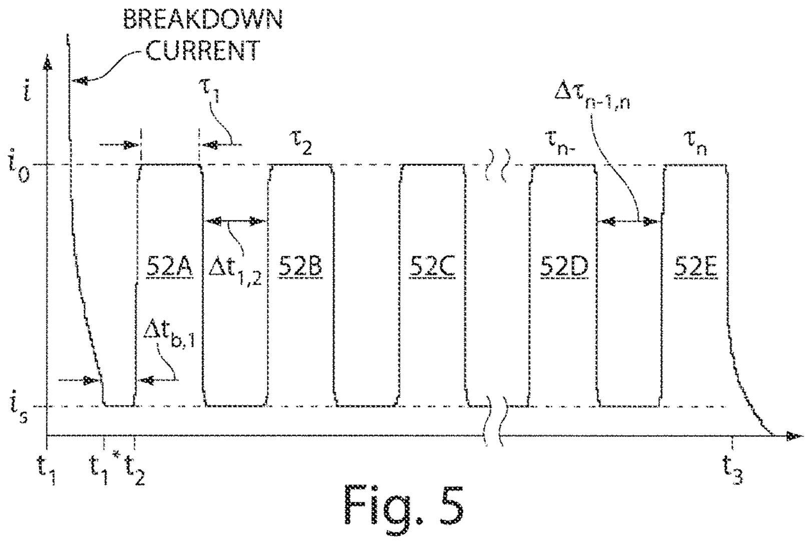
FIG. 5 is a waveform of an example of a drive current applied to a TSI in accordance with the teachings of the present invention.

In FIG. 5, in which the waveform is shown for one example of an igniter current that may be used to excite a TSI as explained above, breakdown occurs at time $t_1$ (peak voltage, followed by maximum current) and is complete at time $t_1$*. Beginning at time $t_2$, a series of (one or more) lower amplitude current pulses 52A-52E (i.e., five pulses, in this example, though the number of pulses is variable) are provided between the electrodes of the igniter. The discharge interval ends at time $t_3$, when the plasma reaches the end of the electrodes. The plasma started at the isolator at time $t_1$. The durations $\tau_1, \tau_2, \ldots \tau_n$ of the respective pulses 52 and their peak current magnitude, $i_0$, should be chosen according to igniter design and gas pressure p. In a traveling spark igniter, the pulse durations and magnitudes are selected, preferably, in accordance with the length of the electrodes and the gap between them. Experimentation is a satisfactory way, and for the moment probably the best way, of setting the values of those parameters for a given igniter design and maximum pressure of its operation.

The time between pulses also depends on igniter design and pressure. The time between the breakdown current, when it reaches near-zero level at $t_1$* and the first follow-on pulse 52A, indicated as $\Delta t_{b,1}$, depends on the breakdown voltage and the specifics of the isolator between the electrodes. The simmer current $i_S$ is non-zero and, as such, helps avoid total plasma recombination; otherwise, a large voltage (comparable to the breakdown voltage) would be needed for initiating the next pulse. So, the current $i_S$ facilitates each subsequence pulse and allows its formation without the need for an additional breakdown pulse. The following table provides parameter values which have been found useful with TSI igniters operating in a simulated combustion chamber at 400 psi pressure:

Electrode length: $\ell$=2.5 mm
Peak pulse current: $i_0 \approx 20\text{-}40$ Amperes,
Duration of the k-pulse: $\tau_k \approx 10\text{-}20$ microseconds,
Time between two consecutive pulses k and k+1: $\Delta t_{k,k+1} \approx 50\text{-}100$ microseconds,
n (i.e., number of pulses)≈3 to 4,
Simmer current: $i_s \approx 1\text{-}3$ Amperes,
Time between end of breakdown and the first follow-on pulse: $\Delta t_{b,1} \approx 5\text{-}20$ microseconds.

These parameters can be significantly different for different design of spark plugs or values of pressure p. For example, for a TSI similar to the one in the previous example and operating at pressure p=900 psi, suitable parameters that have been found useful are:

$i_0 \approx 60\text{-}80$ Amperes,
$\tau_k \approx 20\text{-}40$ microseconds,
$\Delta t_{k,k+1} \approx 30\text{-}40$ microseconds,
n≈7 to 10 pulses,
$i_s \approx 3\text{-}5$ Amperes, and
$\Delta t_{b,1} \approx 3\text{-}10$ microseconds.

Though the peak pulse values $i_0$ and pulse durations $\tau_k$ and the times between individual pulses $\Delta t_{k,k+1}$ have been shown as constant, they need not be uniform or constant. For example, they could actually increase or decrease as a function of time.

Figure 6:
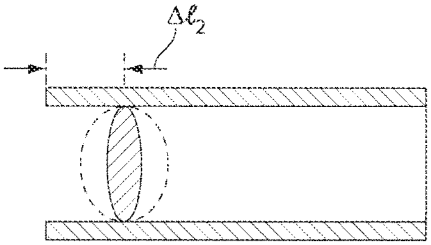
FIGS. 6 and 7 are diagrammatic illustrations of the motion of the plasma cloud of FIG. 4 in a TSI which is operated in accordance with the principles exemplified in the waveform of FIG. 5.
Figure 7:
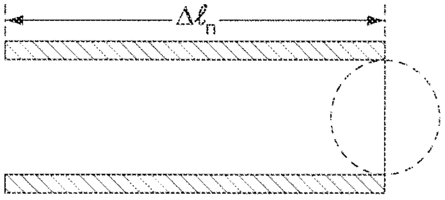

FIGS. 6 and 7 diagrammatically illustrate the operation produced by this pulsed drive scheme. It is assumed the breakdown pulse has already occurred and the first follow-on pulse is in a position $\Delta\ell_1$ away from the surface of the isolator, as in FIG. 4. After a time interval $\Delta t_{1,2}$ following the first pulse, the next pulse $\tau_2$ occurs, after which the plasma is in a new position $\Delta\ell_2$ away from the surface of the isolator. With each successive pulse, the plasma kernel is moved to the right and then at the end of the pulse, allowed to recombine (FIG. 6, showing the plasma position after two pulses), until eventually (FIG. 7) the plasma reaches the end of the electrodes after n current pulses, and is ejected into the combustion chamber. The number of follow-on pulses, n, will depend on the pressure p in chamber, igniter parameters (e.g., the length of the electrodes, the gap between the electrodes, and the shape of the electrodes) and current discharge parameters (e.g., peak values of pulses, their durations, the inter-pulse intervals, and minimum current value between pulses). Some experimentation may be required to find suitable values.

Although the current pulses are shown as positive pulses in FIG. 5, it should be realized that negative pulses can also be used, or alternating pulses or some other pattern of pluralities. The Lorentz force $F_L$ is proportional to the square of the current and is, therefore, independent of current polarity. Additionally, the discharge current pulses, shown as rectangular in FIG. 5, could have any suitable waveform, such as triangular shape or sinusoidal shape.

As stated above, with increased operating pressure, the breakdown of voltage along the surface of the isolator also increases. Increase in breakdown voltage has a negative impact on the lifetimes of the isolator and electrodes. Such negative effects can be avoided or significantly reduced by limiting the breakdown current. For example, introducing a resistor into the high voltage circuit, as described below, limits breakdown current without wasting significantly energy when the breakdown discharge is of short duration in comparison with the total interval of follow-on discharge pulses. Limiting the current causes the mode of operation to differ substantially from that of prior TSI systems. In prior TSI systems, such as those shown in U.S. Pat. Nos. 6,321,733 and 6,474,321, it was desired that a high breakdown current be followed immediately by high current from capacitors to create maximum acceleration and plasma speed. The goal was to get the plasma to reach the end of the electrodes and move into the combustion chamber in a single discharge pulse. In contrast, in a high pressure environment, plasma motion is small following breakdown. Thus, it is acceptable to limit the breakdown current since the breakdown current is only used to create the plasma near the isolator surface, rather than to actually produce significant plasma motion.

The interval between the end of the breakdown current pulse and the first follow-on current pulse, $\Delta t_{b,\,t1}$ depends on the peak value of the discharge current. Assuming that a resistor $R_b$ is used to achieve this current limiting effect, than the delay time depends on the value of that resistor, which depends on the applied breakdown voltage which, in turn, depends upon the pressure p. Thus, the value of resistor $R_b$ can be chosen to minimize stress on the isolator and electrode wear.

Figure 8:
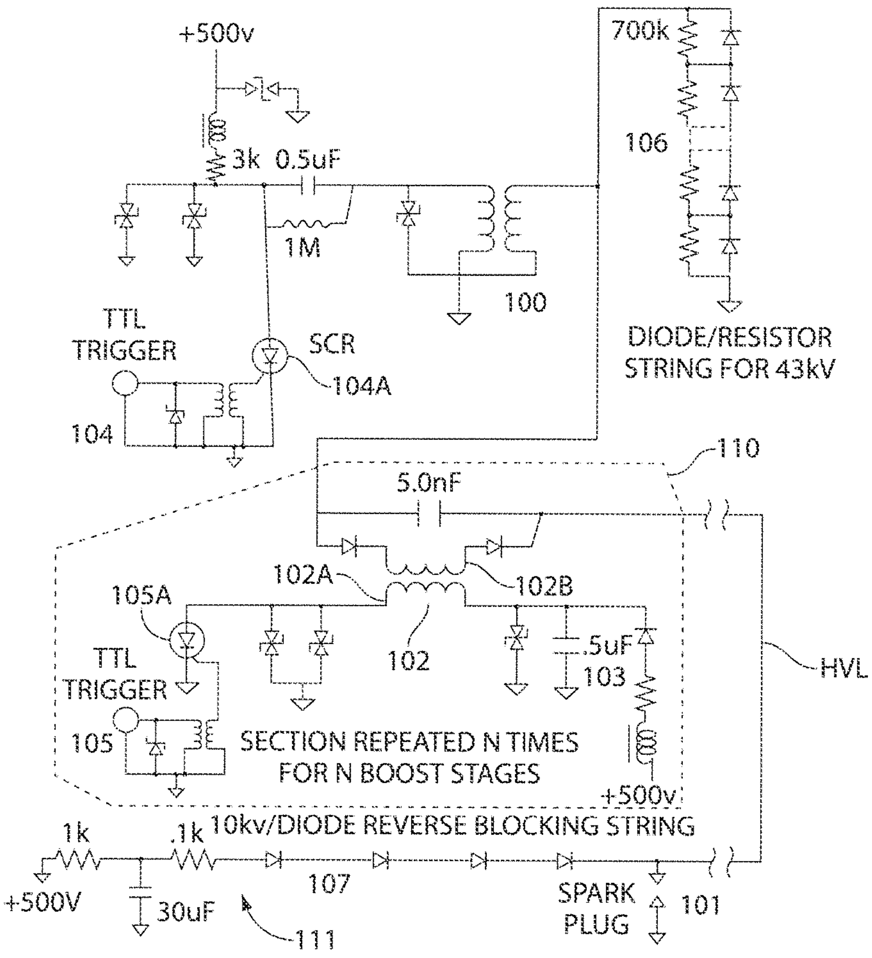
FIG. 8 is a simplified schematic circuit diagram for an example of an ignition drive circuit usable to generate a current drive waveform for a TSI as taught herein, including, for example, the waveform or drive signal of FIG. 5.

FIG. 8 shows a partial schematic circuit diagram for an example of an electronic circuit for producing the breakdown pulse and follow-on pulses as depicted in FIG. 5. In FIG. 8, circuitry is shown for generating only the breakdown pulse and one follow-on pulse. For each additional follow-on pulse that is desired, the circuitry 110 enclosed in a dashed line can be replicated and all such circuits can be connected with the secondary windings of their boost transformers 102 in series, so that each such circuit will, in turn, deliver one of the sequenced pulses to the igniter. (Note that a parallel arrangement is also possible.)

A high voltage, for providing breakdown discharge is generated by a high energy ignition coil 100, triggered by a signal applied at 104 to cause switching of SCR 104A. Coil 100 may be any suitable ignition coil such as, but not limited to, coil model 8261 sold by Autotronic Controls Corporation of El Paso, Texas, d/b/a MSD Ignition. Though usually referred to in the industry as an “ignition coil,” element 100 actually is a transformer. The aforementioned model 8261 ignition coil has a low inductance primary and provides a 42-43 kV output from its secondary coil when the primary coil is energized. The secondary coil of transformer 100 is directly connected (through secondary coil 102B of boost transformer 102) to one or more electrodes of igniter 101, another electrode of which is grounded.

The string 106 of diodes, each paralleled by a high resistance, limits the output voltage of the ignition coil 100 to a single polarity and prevents ringing.

After the breakdown pulse, a trigger signal is applied at 105 to cause a follow-on pulse to be generated. The boost transformer 102 feeds the high voltage line (HVL) to igniter 101 with a pulse of current induced by discharging capacitor 103. Capacitor 103 is charged to a relatively low voltage such as, for example, about 500V and then discharged through the primary coil 102A of transformer 102 to ground through the SCR 105A.

The trigger signals can be generated by any suitable circuit that may provide either fixed or programmable parameters.

The igniter electrode(s) connected to the high voltage line are also connected, through a string of diodes 107, and an RC network 111, to a low voltage supply, such as the indicated 500V supply. The resistor values in network 111 are set to deliver the simmer current, $i_s$ The ignition circuit of FIG. 8, it will be appreciated, represents just one way to generate the breakdown voltage and to deliver the initial current and the follow-on pulses of current that are desired. Any other suitable mechanism may be employed that generates comparable pulsing. For example, a resonant current circuit that could provide oscillating current pulses, such as sinusoidal current pulses, could be used instead of the indicated plurality of sub-circuits, each of which generates a single pulse. Moreover, by proper inversion of polarities of voltage and diodes, the circuit of FIG. 8 could be used to generate negative pulses instead of positive pulses.

Figure 9:
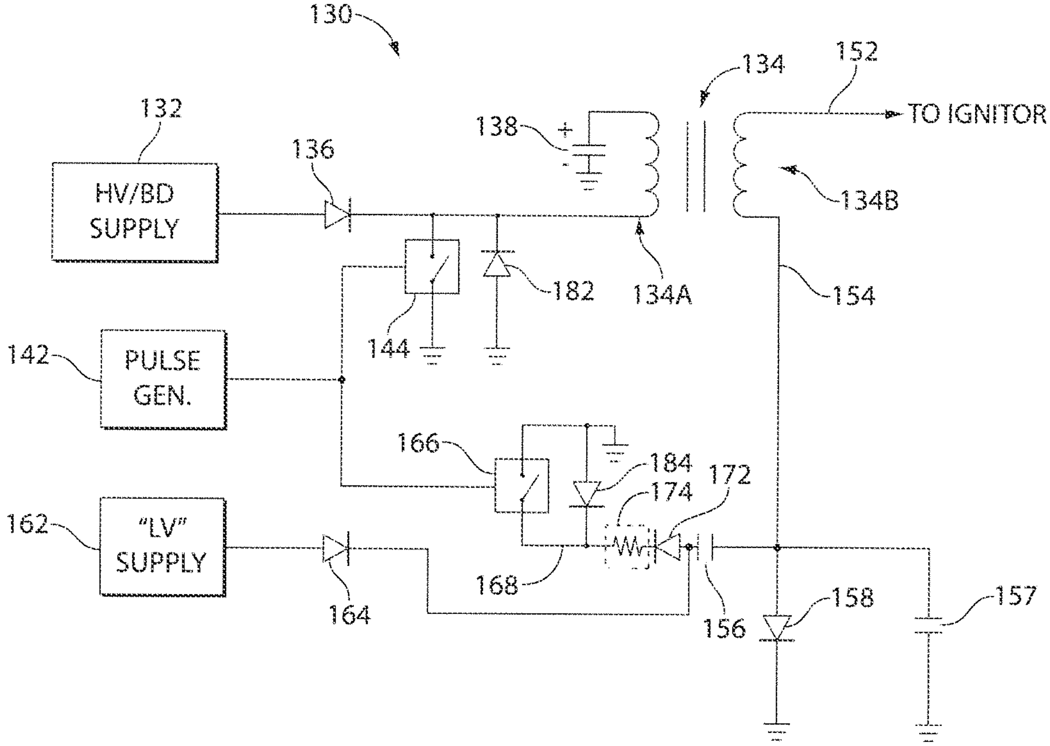
FIG. 9 is a simplified part-block, part schematic circuit diagram of another embodiment of an ignition circuit for generating an ignition drive to a TSI as taught herein.

Another example of an ignition circuit architecture (in simplified form) is shown in FIG. 9 at 130. Only the basic circuit components are shown, it being understood that a practical implementation may require other customary components. Power supply 132 supplies a voltage (termed the “high” voltage for purposes of distinguishing it, only). The voltage is high enough so that it can generate, when stepped up by transformer 134, a breakdown voltage sufficient to create a plasma at the igniter (not shown). Power supply is connected to a first end of primary winding 134A through a diode 136, to charge a capacitor 138, connected between the other end of the primary winding and ground. A pulse generator 142 supplies a train or sequence of pulses. On a first pulse, an output signal from pulse generator 142 closes electronically controlled switch 144. This action grounds the anode of diode 136, effectively disconnecting supply 132 so that it is not short-circuited, and allows capacitor 138 to discharge through the primary winding, Transformer 134 is a saturable-core step-up transformer. The HV supply 132 typically has an output voltage of a few hundred volts. The closing of switch 144 generates a large voltage swing across the transformer primary. Typically, a turns ratio of about 1:35-1:40 may be used in the transformer, and this will step up the several hundred volt swing on the primary up to the range of tens of thousands of volts across the secondary winding, 134B. This latter voltage is sufficient to produce breakdown when applied to an igniter (connected to one end of the secondary winding, but not shown).

The aforesaid pulse preferably also saturates the core of transformer 134.

Due to the core saturation, if a next pulse is supplied by the pulse generator 142 before the saturation ebbs totally, such pulse will not generate a breakdown-level output voltage on output line 152.

The other end of primary winding 134B, at 154, and one end of a capacitor, 156, are tied to ground via a diode 158. Capacitor 156 is charged by a “low voltage” (LV) supply through a protective diode 164. When a pulse from pulse generator 142 is received by electronic switch 166, node 168 is grounded and capacitor 156 is grounded through series-connected diode 172, resistor 174 and switch 168.

Low Voltage supply 162 may typically supply a voltage in the range of 0-1000 volts. Capacitor 156 is a large capacitance in a typical ignition system and resistor 174 may be sized to limit the discharge current (pulled through the secondary winding 134 of the transformer) to about 50 Amperes (less if a lower current will suffice in the follow-on pulses).

Diodes 182 and 184 merely protect their respective switches from reverse polarity spikes that could be destructive to them.

Supplies 132 and 162 are shown as separate but a single supply may be used in some applications. Also, the terms low voltage and high voltage are not intended to require that the output of supply 132 be at a higher voltage than the output of supply 162, though that is most typical.

Diode 164 is included for the same reason as diode 136, to protect its associated power supply from having a short-circuited output when the associated switch is closed.

Depending on the exact construction of the supplies 132, 162, it also may be desirable to place a resistance in series between the one or both of the supplies and corresponding switch 144 or 166, as applicable, to limit the output current of the supply and the charging time of the corresponding capacitor.

Switches 144, 166 may be implemented using various semiconductors, such as SCRs, IGBTs (especially for switch 144), MCTs and other high voltage switching elements as now or in the future may exist.

A small capacitor, 159, may bypass diode 158, providing a low impedance path to ground for rapid voltage changes and protecting diode 158 against large reverse spikes.

Figure 10:
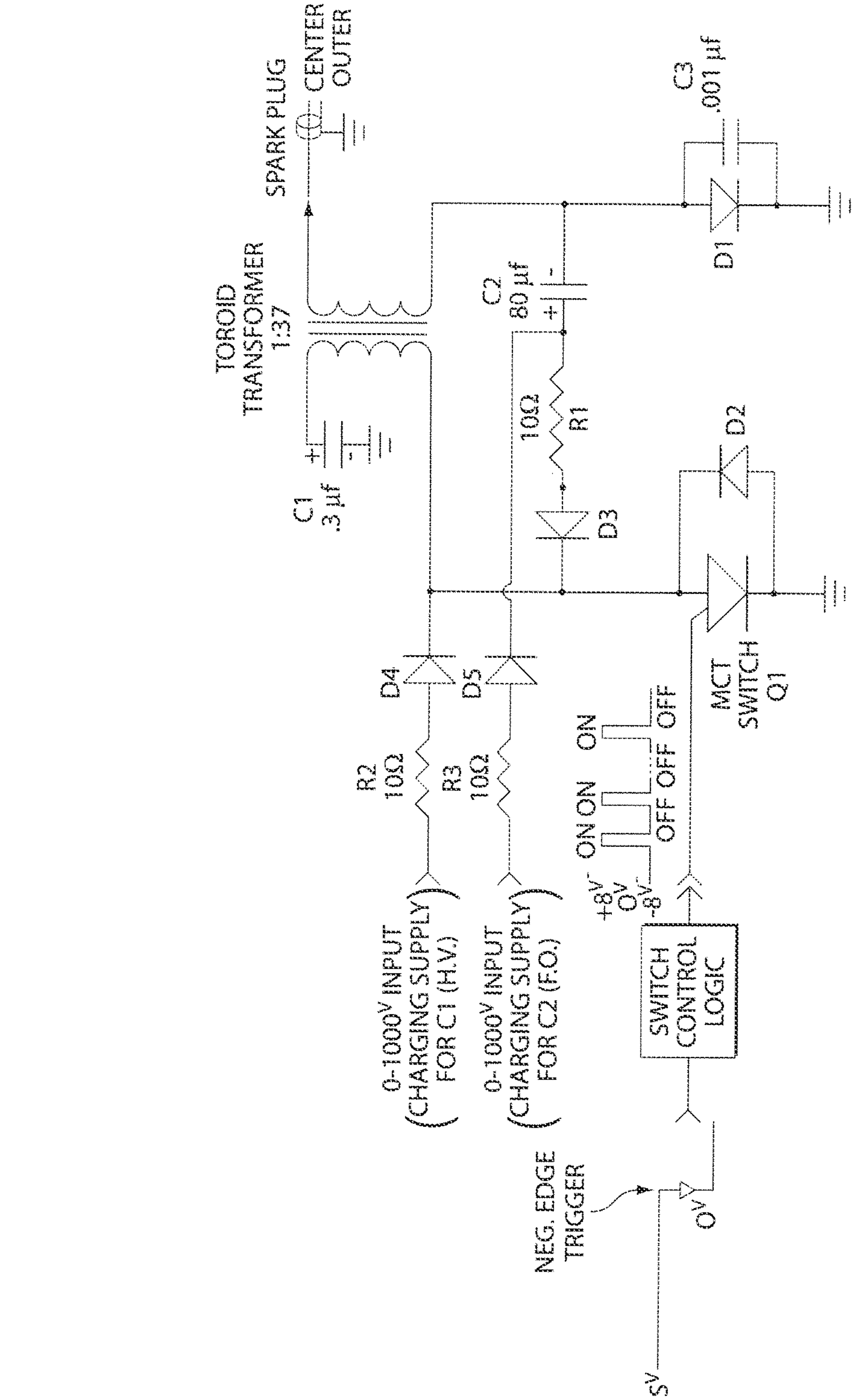
FIG. 10 is a simplified part-block, part schematic circuit diagram of yet another embodiment of an ignition circuit for generating an ignition drive to a TSI as taught herein.

Other variations are possible. For example, instead of a single pulse generator actuating switches 144 and 166, each switch may be actuated by a different pulse generator, or one pulse generator may be employed with different outputs or differently conditioned output signals (possibly derived from a common signal) driving the switches. Or, one switch may be used, instead of two switches, as shown in FIG. 10, referring to switching element (e.g., MCT) 186. (In FIG. 10, the resistors R are expressly shown though they may not be needed, depending on power supply details.) If different pulse generators drive each of the switches, they can be controlled independently and this will permit a variety of modes of operation to be accommodated.

In FIG. 9, resistor 174 is shown in a dashed-line box, to indicate it is optional. Irrespective of the fact that supply 162 may be set in conjunction with capacitor 156 to control the desired amplitude of follow-on current pulses, all of the energy stored in capacitor 156 cannot be transferred to the arc. To sustain a current in the follow-on pulses over the interval of each pulse, the capacitor 156 must be discharged at a controlled rate. One way to do this is to discharge the capacitor through a resistor, such as resistor 174. Unfortunately, the use of resistor 174 results in the dissipation of a lot of the stored energy as heat. Indeed, more energy may be lost as heat in resistor 156 than is expended in the movement of the plasma. Hence this circuit suffers from inefficient use of energy.

Figure 11:
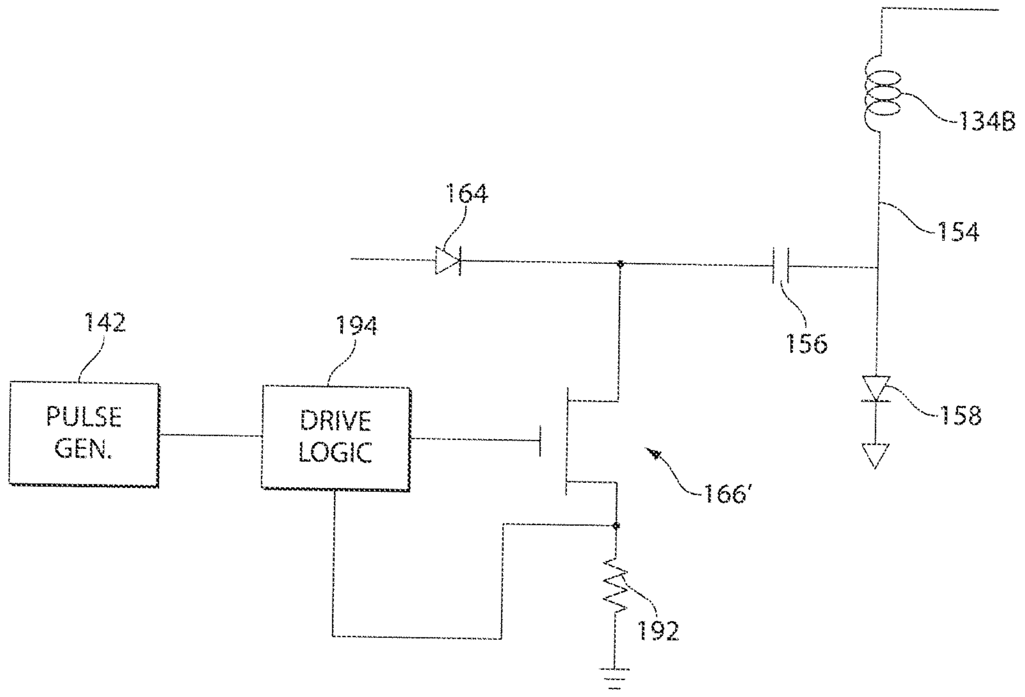
FIG. 11 is a simplified part-block, part schematic circuit diagram of a still further embodiment of an ignition circuit for generating an ignition drive to a TSI as taught herein.

It is possible to improve the efficiency of the circuit and to reduce the heat dissipation by making the switch element 166 a controlled current drainage path. Then, instead of using resistance 174 to limit the current drain off of capacitor 156, the switch transistor (or like element) takes care of that need, providing controlled discharge. More specifically, as shown in FIG. 11, an active switching element (here indicated as a MOSFET 166'), is connected from node 168 to ground through a resistor 192. The voltage across that resistor is sensed as a proxy for measuring the actual current through transistor 166'. Gate drive logic 194 interposed between the pulse generator and the gate of transistor 166', responsive to the voltage on resistor 192, operates the transistor as a switching regulator, with variable duty cycle and a resulting lower power dissipation than that arising from the use of resistor 174. Drive logic 194 may be implemented in various ways and may include fixed logic or it may include programmable logic, possibly including a microcontroller to operate the logic. An advantage of using a microcontroller is that the logic can then be configured to operate the circuit to perform in the various modes discussed herein—e.g., with or without simmer current.

Note that although the generation of pulses of positive polarity will result from the illustrated examples of ignition circuits, those skilled in the art of electronics will readily be able to derive therefrom ignition circuits that will produce negative polarity pulses and even pulses of varied polarities, should it be desired to have same. It may also be desirable that some or all trigger pulses be o polarity differing from the output pulses.

The detailed design of the drive logic and the parameters for the breakdown voltage, follow-on pulses, igniter, etc. will all depend on the particular engine specifications which the ignition system is required to meet. Those requirements, and considerations such as cost, component availability, and so forth will influence component selection, as well. Determination of some of these parameters may require a degree of experimentation on a model of the engine(s) for which the ignition system or circuit is intended.

Although the problems and their solution have been discussed using just one form of TSI, both apply equally to other TSI designs, using both parallel and coaxial electrodes.

While certain methods and apparatus have been discussed herein for use with internal combustion engines operating at high and very high pressures, it will be understood that this technology also can be used with traveling spark igniters in internal combustion engines operating at lower, conventional pressures, or even with conventional spark plugs. The advantages, however, probably will be greatest with traveling spark igniters.

Also, it should be understood that although a theory of operation has been presented, there are number of simplifying assumptions which may very much limit application of this theory. Nevertheless, the invention, as claimed, does produce a working ignition system in a simulated high pressure engine environment, and any simplifications or errors in analysis will be understood not to detract from the value of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of plasma generation, comprising:

a. applying to an igniter having at least a pair of electrodes a voltage of amplitude sufficient to cause breakdown to occur between the electrodes, resulting in a high current electrical discharge in the igniter in an initiation region, and formation of a plasma kernel adjacent said initiation region; and b. following breakdown, switching a switching element to apply to said electrodes at least one follow-on pulse of current in the igniter by discharging a plasma-sustaining capacitor via a current-controlling discharge path such that at least most of the current in the igniter flows in the discharge path through each of the switching element and the plasma-sustaining capacitor.

2. The method of claim 1, wherein the switching element is of a type that can be switched while current therethrough is not zero.

3. The method of claim 2, wherein the switching of the switching element includes turning off the switching element while the current therethrough is not zero.

4. The method of claim 2, wherein-the at least one follow-on pulse are voltage pulses generated by the capacitor pulling its discharge current through an inductance.

5. The method of claim 4, wherein the inductance is in series with the capacitor and one of the electrodes.

6. The method of claim 1, wherein the discharge path modulates the current in the igniter.

7. The method of claim 1, further comprising providing at least one limit of current drain off of the plasma-sustaining capacitor.

8. The method of claim 4, wherein the current flowing through the inductance induces a second current flowing through a second inductance inductively coupled to the inductance such that the second current flows from a second capacitor through the second inductance.

9. The method of claim 1, further comprising applying a pulse to the switching element using a pulse generator to cause the discharging of the plasma-sustaining capacitor.

10. The method of claim 1, wherein, while discharging the current from the plasma-sustaining capacitor, the current discharged by the plasma-sustaining capacitor flows between the switching element and the electrodes through an inductance.

11. The method of claim 1, wherein the switching the switching element discharges the plasma-sustaining capacitor such that all of the current in the igniter flows in the discharge path through each of the switching element and the plasma-sustaining capacitor.

12. The method of claim 1, wherein the switching element comprises a thyristor or an IGBT.

13. A circuit for plasma generation, the circuit comprising:

an igniter having at least a pair of electrodes and configured to have applied thereto a voltage of amplitude sufficient to cause breakdown to occur between the electrodes, resulting in a high current electrical discharge in the igniter in an initiation region, and formation of a plasma kernel adjacent said initiation region;

a plasma-sustaining capacitor; and a current-controlling discharge path comprising a switching element, the switching element being configured such that, when the switching element is switched following breakdown to apply at least one follow-on pulse of current in the igniter, at least most of the current in the igniter flows in the discharge path through each of the plasma-sustaining capacitor and the switching element.

14. The circuit of claim 13, wherein the switching element is of a type that can be switched while current therethrough is not zero.

15. The circuit of claim 14, wherein the circuit is configured to, following breakdown, turn off the switching element while the current therethrough is not zero.

16. The circuit of claim 14, further comprising an inductance, wherein the plasma-sustaining capacitor is configured to pull its discharge through the inductance to generate the at least one follow-on pulse as one or more voltage pulses.

17. The circuit of claim 16, wherein the inductance is in series with the capacitor.

18. The circuit of claim 13, wherein the switching element is configured to modulate a discharge current of the plasma-sustaining capacitor.

19. The circuit of claim 13, wherein the circuit is further configured to provide at least one limit of current drain off of the plasma-sustaining capacitor.

20. The circuit of claim 13, further comprising a first inductance and a second inductance that is inductively coupled to the first inductance, wherein the first inductance is configured to, when the current is flowing through the first inductance, induce a second current flowing through the second inductance such that the second current flows from the electrodes through the second inductance.

21. The circuit of claim 13, further comprising a pulse generator configured to, following breakdown, apply a pulse to the switching element to cause the discharging of the plasma-sustaining capacitor.

22. The circuit of claim 16, wherein the current controlling-discharge path is configured such that, while the switching element discharges the plasma-sustaining capacitor, at least most of the current flows through each of the inductance, the plasma-sustaining capacitor, and the switching element.

* * * * *